March 8, 1949.  F. W. COFFING  2,464,071
TIRE TRANSFER DEVICE FOR TRUCKS AND THE LIKE
Filed May 15, 1947  2 Sheets-Sheet 1

Inventor.
FREDRICK W. COFFING.

March 8, 1949. F. W. COFFING 2,464,071
TIRE TRANSFER DEVICE FOR TRUCKS AND THE LIKE
Filed May 15, 1947 2 Sheets-Sheet 2
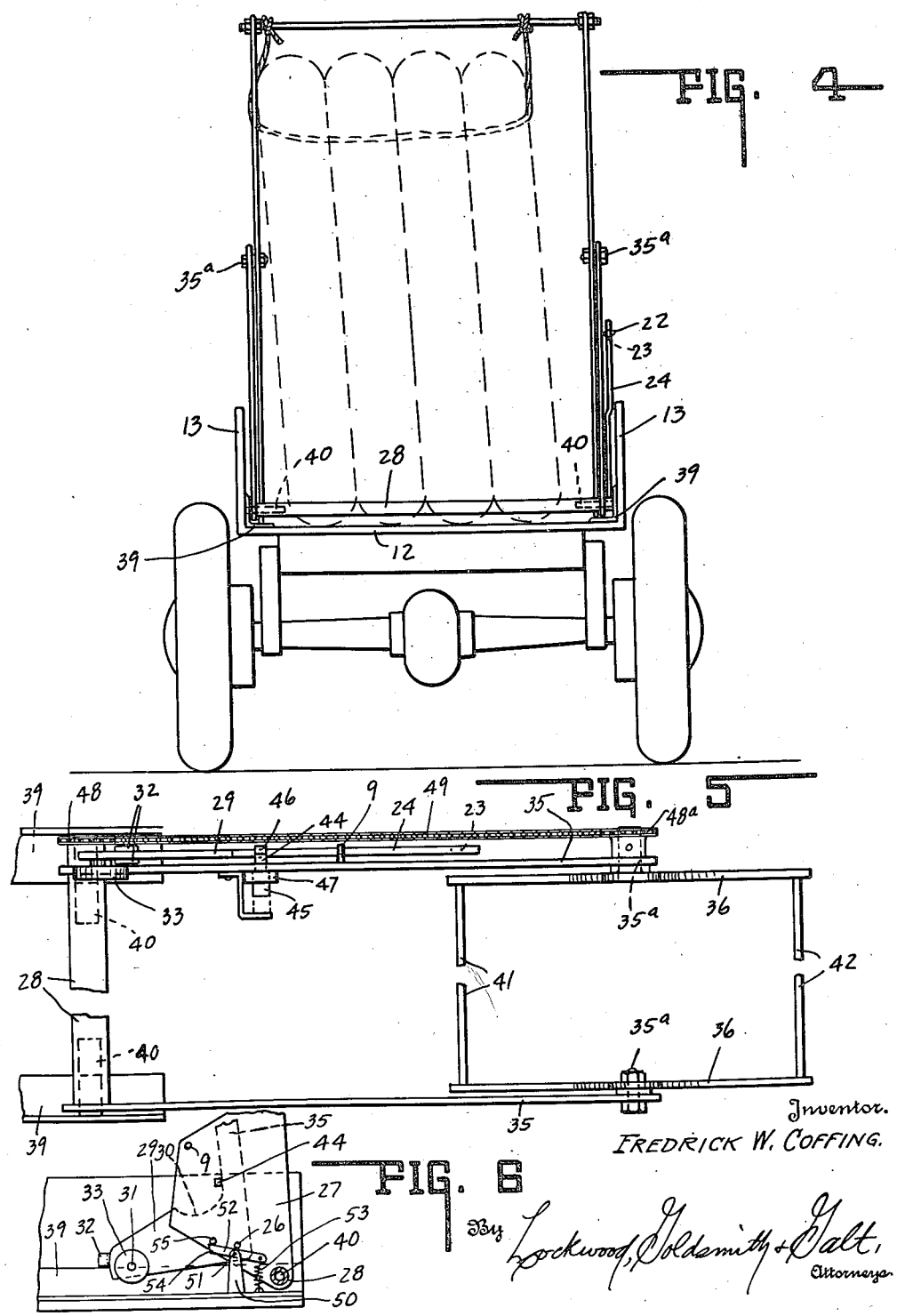

Patented Mar. 8, 1949

2,464,071

UNITED STATES PATENT OFFICE 2,464,071

TIRE TRANSFER DEVICE FOR TRUCKS AND THE LIKE

Fredrick W. Coffing, Danville, Ill., assignor to Coffing Hoist Company, Danville, Ill., a corporation Application May 15, 1947, Serial No. 748,325

5 Claims. (Cl. 214—77)

This invention relates to a tire and like loading and unloading device.

The chief object of the present invention is to provide a vehicle with a loading and unloading device whereby heavy loads normally requiring several persons can be loaded and unloaded by a single person such as the driver of such vehicle.

It is well known that tractor tires are in the neighborhood of five feet in diameter and have a tire section diameter of about a foot or so and weigh in the neighborhood of a hundred pounds or so. Such an article obviously is both heavy and clumsy to handle and more than one man can take care of, especially in the act of loading and unloading, to wit, elevating to the vehicle bed level and lowering to the ground level.

The chief feature of the present invention accordingly resides in the means for raising into and lowering out of a vehicle a load and wherein such means is operable by one man.

Another feature of the present invention resides in the power for such means comprising a cable or like.

A further feature of the invention resides in the articulated apparatus for effecting raising and lowering, the manually operable latch for rigidifying such apparatus and the automatic release of the latch.

Still another feature of the invention resides in the load accommodating cradle structure.

Still another feature of the invention resides in the use of a reversible chain hoist for power application.

Still a further feature resides in a one-way non-dropping device.

An additional feature resides in the arrangement, through a chain and sprocket control for at all times maintaining the cradle structure in its vertical load carrying position, and thereby steady it and prevent swing or sway such as may result in unseating the load.

Other objects and features of the invention will be set forth more fully hereinafter.

The full nature of the invention will be understood from the accompanying drawings and the following description and claims.

In the drawings,

Fig. 1 is a longitudinal sectional view through a vehicle and the invention looking toward the power applied side thereof, the parts being shown in the vehicle loaded position.

Fig. 2 is a similar view of the rear end of vehicle with the parts in the over-center position.

Fig. 3 is a similar view with the parts in the lowermost position.

Fig. 4 is a rear elevation of the end of the vehicle and the parts in the loaded position.

Fig. 5 is a top plan view of the parts shown in Fig. 3 and in the corresponding position.

Fig. 6 is a view showing a modified and preferred form of the invention, or rather so much as is necessary to illustrate same.

In Fig. 1 of the drawings 10 indicates generally the cab of a delivery truck having bed 12 and sides 13. Herein upon the right side and to the cab is suitably secured an eye bolt 14.

Hooked thereto as at 16 is a chain hoist 17 having load chain 18, operating handle 19 and control mechanism not shown. The chain terminates in hook 20. This hoist structure may be similar or identical to any one of the hoists shown in the following patents: No. 2,377,324, dated June 5, 1945; No. 2,269,438, dated January 13, 1942; No. 1,937,331, dated November 28, 1933; or No. 1,862,331, dated June 7, 1932.

The operation briefly is that hook 20 can be pulled toward the hoist 17 by pumping the handle as in load elevation as described in said patents with the control mechanism set for "up" operation. The hook 20 may recede from the hoist 17 by conditioning the control mechanism to the "down" position as described in said patents. This corresponds to load lowering and is of step by step "pay-out" character.

A ring 21 on or a loop in cable 22 is arranged for connection to hook 20. The other end of the cable is connected at 23 to lever arm 24 of member 25 pivoted at 26 upon a plate 27 pivoted at 28 upon the rear end of the vehicle by bed supported pillow blocks or in a socket carried by side 13 as desired.

Member 25 is extended at 29 and includes notched or cut out portion 30. The free end pivotally mounts at 31 roller wheel 33. Also carried by the free end is fork 32 disposed adjacent an arcuate end formation 32a.

Member 27 includes face 34 and extension 35. The latter at its free end pivotally supports triangular type cradle frame member 36 with upward extension 37 of a length preferably greater than the radius of tires to be accommodated. The same is apertured at 38 so that the tires may be tied or chained thereto for the vehicle may be devoid of a tail gate.

The invention, however, may be used with a tail gate equipped vehicle since the invention, in operation, does not interfere with the same. Tying, however, prevents the tires from rolling forward and backward in the vehicle and also side tipping.

As shown more particularly in Figs. 4 and 5 it will be noted adjacent each side 12 there is provided an angle member 39 which constitutes the supports for pivot 28. This pivot can be a tube of fixed length or of extensible character for different widths of beds. Herein each angle member 39 includes a trunnion 40 seated in the adjacent end of tube 28 to which is welded, or otherwise secured at opposite ends, the members 27 aforesaid.

To the arms 35 is pivoted at 35a the cradle side plates 36 which at the bases are connected together as at 41 and 42. Thus as the power lever 24—29 is oscillated the cradle aforesaid is oscillated. Note herein, see Fig. 1, the angle member, adjacent the power applied side, is extended as at 43 to form a track for roller 33.

Herein the power side member 27, see Fig. 2, slidably supports a headed block or stop 44 having head 45 and cam face 46. It is slidable in boss 47 on said member. It is manually pushed toward member 24—29 and automatically returned as hereinafter pointed out. Member 27 also carries stop and leverage lowering pin 9.

Operation

When the hoist is vehicle attached and connected to cable 22 and with the cradle in lowered position the tire or tires are rolled onto the cradle structure and tied thereto all as shown in Fig. 3. Member 24 is then pulled down, see Fig. 3, beyond pin 9. The plunger 44—45 is then pushed "in" so its free end overlies surface 30 of member 24—29. During a portion of this loading movement the cable guide or fork 32 is engaged by cable 22.

The hoist, conditioned for load elevation or up operation, is then actuated to tilt member 24—29 on its pivot 26 until surface 30 engages said plunger. Then the lever arm and the cradle are simultaneously elevated by counter clockwise rotation about the axis of trunnions 40 until the cradle is disposed above the bed and partially in and partially out of the same.

During this entire time and until the aforesaid just passes over center, see Fig. 2, the cable 22 is under tension applied by the hoist. When this structure passes over center the cable 22 is under tension applied by the load. The hoist then is conditioned for load lowering and operated to pay out chain 18 to permit forward travel and lowering of the cradle and load into the vehicle and to the bed thereof. In this movement the lever 24 starts rearward and member 27 continues forward.

Note that in this movement roller or wheel 33 rides the track 43. Also the plunger 44—45 is no longer in contact with the lever. However before the parts reach the position shown in Fig. 1, the opposite side of face 30 engages inclined face 46 of the plunger to reverse the plunger or rather withdraw it from its extended position. When fully retracted the member 29 passes over the end of the plunger and the faces 34 of the members 27 engage flanges 39. The load is now disposed in the vehicle.

If, as and when desired or required there may be provided a releasable holding device to hold the cradle carrying lever to the actuating lever when the former is about centrally positioned in the loading movement.

In Fig. 6 the same parts heretofore illustrated herein bear the same numerals. However, herein there is provided a fulcrum or compression arm bracket 50 rigid with the angle 39. Pivotally supported at 51 therein is a rocker arm 52 having one end anchored to an end of a tension spring 53 anchored at its other end to the angle or base. The free end of arm 52 is relieved as at 54 for cam purposes. Lever member 27 carries a pin 55 disposed in the path of arm 52. When the lever 27 passes over center, it will be recalled that the stop 44 leaves the power lever 25 and crosses over the pocket 30.

The purpose of the mechanism just described is to prevent rapid lever separation, as it were, and insure that the wheel 33 contacts with the trackway so that the lowering into the vehicle is not a dropping action. This is because the pin 55 engages the arm 52 then tilting same and extending spring 53 until the pin 54 overrides the arm and passes beyond the same. At this time wheel 33 rides the track. In reverse movement the pin 55 engages cam face 54 and tilts the arm 52 reversely. Thus in the reverse movement the aforesaid holding mechanism is ineffective.

To unload the vehicle, the hoist is reconditioned for load elevation and operated to tilt the power lever 24 counter clockwise on its pivot 26, see Fig. 1. Roller 33 on said lever rolls rearwardly in this operation so that the cradle support members 27—35 move clockwise upon pivots 40. This travel is continued until the cradle and load pass over center in the opposite or load lowering direction.

Then the hoist is reconditioned for load lowering or to pay out chain 18. At this point pin 9 engages the member 24 which increases the leverage in load lowering. In continued payout, roller 33 leaves the track, and the cradle, its pivoted support and the power lever 24 continue rearward in lowering movement. Member 24 then separates from pin 9. When the cradle or load touches the ground or the members 27 have their faces 34a engage the flanges 39 further lowering is prevented. Note that in the lowering the plunger 44—45 has no function and in elevating the stop 9 has no function.

A peculiarity of this invention is that for raising or lowering the load or rather loading or unloading thereof respectively each operation requires initial tension power application until an over center condition is attained and then tension payout or release is required for continued movement over center until the loaded or unloading final positions are attained. The only difference between the two operations is that the plunger 44 must be manually projected before starting to load and the plunger is automatically retracted near the end of the loading operation.

As best illustrated in Figs. 3 and 5, a sprocket and chain control may be applied to the cradle 36 and the supporting bed 12 such as to effect a steadying action and prevent swaying such as may unseat the load under certain conditions, the cradle being thereby rigidly retained in its vertical carrying position throughout its path of travel to and from its loading and unloading movement.

This may be accomplished by mounting a rigid sprocket-like disk 48 on one of the angle members 39 in axial alignment with the trunnion 40 so as to be fixed and without rotary movement. A similar toothed sprocket-like wheel 48a may be rigidly secured through a suitable sleeve connection with the side plates 36 of the cradle through which its pivotal support 35a extends. Thus the wheel 48a is fixed against rotation to one of the plates 36.

Connecting the two wheels 48, 48a there is a sprocket chain 49 which chain is coextensive with the opposed pivotal mountings of the member 27 and its extension 35, as indicated at 35a and 40.

Upon the frame member 36 being swung upwardly and overcenter onto the bed 12, or in its reverse unloading movement, the chain will roll about the fixed wheel 48 while interlocking therewith the fixed wheel 48a so as to maintain the same relative positions therebetween throughout the entire loading and unloading movement. By reason thereof the chain will cause the wheel 48a to at all times maintain the cradle frame member 36 in its vertical position and prevent any oscillation or swinging movement thereof.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A loading and unloading device for a vehicle including a reversible, hand operable hoist secured at one end to the vehicle and having a flexible means extending therefrom for pulling and paying out purposes, a skeleton frame pivoted on the vehicle, a lever pivoted on the frame and connected to one end of said means, a cradle structure pivoted upon the frame in suspended relation thereto, the cradle structure including two triangular type side members, the base thereof being disposed downwardly at all times, and means connecting the base included vertices and extending from member to member, said members being pivoted substantially at the other vertices.

2. A loading and unloading device for a vehicle including a reversible, hand operable hoist secured at one end to the vehicle and having a flexible means extending therefrom for pulling and paying out purposes, a skeleton frame pivoted on the vehicle, a lever pivoted on the frame and connected to one end of said means, a cradle structure pivoted upon the frame in suspended relation thereto, and a latch operatively interposed between the lever and the frame for effecting initial loading movement of the frame and automatically releasable in final loading movement of the frame.

3. A device as defined by claim 2, wherein the latch comprises a plunger slidable upon one portion of the lever and the frame and engageable when projected therefrom in the path of the other of the aforesaid, the plunger having a cam face and the said other of aforesaid having cam face contact for effecting plunger retraction.

4. A loading and unloading device for a vehicle including a reversible, hand operable hoist secured at one end to the vehicle and having a flexible means extending therefrom for pulling and paying out purposes, a skeleton frame pivoted on the vehicle, a lever pivoted on the frame and connected to one end of said means, a cradle structure pivoted upon the frame in suspended relation thereto, the lever including an arm, a wheel rotatably supported in the end thereof and operatively rollable upon the vehicle bed in final loading and initial unloading movement.

5. A loading and unloading device for a vehicle including a reversible, hand operable hoist secured at one end to the vehicle and having a flexible means extending therefrom for pulling and paying out purposes, a skeleton frame pivoted on the vehicle, a lever pivoted on the frame and connected to one end of said means, a cradle structure pivoted upon the frame in suspended relation thereto, and one-way load dropping preventing means comprising a normally tensioned tiltable means carried by the vehicle, and a means tilting member carried by the frame for last mentioned means engagement and release thereof, the engagement effecting tensioning of the flexible means to prevent load dropping in the loading operation.

FREDRICK W. COFFING.

REFERENCES CITED

The following references are of record in the file of this patent:

UNITED STATES PATENTS

| Number | Name | Date |
|---|---|---|
| 1,378,631 | Stone | May 17, 1921 |
| 1,408,576 | Frantz | Mar. 7, 1922 |
| 2,099,998 | Berg | Nov. 23, 1937 |
| 2,105,353 | Irish | Jan. 11, 1938 |
| 2,332,962 | Barrett | Oct. 26, 1943 |
| 2,386,216 | Hay | Oct. 9, 1945 |